United States Patent
Fujishiro et al.

(10) Patent No.: US 10,285,212 B2
(45) Date of Patent: May 7, 2019

(54) MASTER BASE STATION, MOBILE STATION, AND COMMUNICATION CONTROL METHOD

(71) Applicant: KYOCERA CORPORATION, Kyoto (JP)

(72) Inventors: Masato Fujishiro, Yokohama (JP); Kugo Morita, Yokohama (JP); Chiharu Yamazaki, Tokyo (JP); Yushi Nagasaka, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 117 days.

(21) Appl. No.: 15/127,144

(22) PCT Filed: Mar. 20, 2015

(86) PCT No.: PCT/JP2015/058583
§ 371 (c)(1),
(2) Date: Sep. 19, 2016

(87) PCT Pub. No.: WO2015/141845
PCT Pub. Date: Sep. 24, 2015

(65) Prior Publication Data
US 2018/0176974 A1    Jun. 21, 2018

Related U.S. Application Data

(60) Provisional application No. 61/968,017, filed on Mar. 20, 2014.

(51) Int. Cl.
*H04W 76/15* (2018.01)
*H04W 36/08* (2009.01)
(Continued)

(52) U.S. Cl.
CPC .............. *H04W 76/15* (2018.02); *H04L 5/001* (2013.01); *H04W 16/24* (2013.01); *H04W 36/08* (2013.01);
(Continued)

(58) Field of Classification Search
CPC .. H04B 7/0404; H04B 7/0628; H04B 7/0413; H04B 7/0689; H04B 7/0697;
(Continued)

(56) References Cited

U.S. PATENT DOCUMENTS

2009/0125650 A1    5/2009    Sebire
2011/0176531 A1    7/2011    Rune et al.
(Continued)

FOREIGN PATENT DOCUMENTS

JP    2012-504898 A    2/2012
JP    2013-179712 A    9/2013
(Continued)

OTHER PUBLICATIONS

International Search Report issued in PCT/JP2015/058583; dated Jun. 23, 2015.
(Continued)

*Primary Examiner* — Daniel Lai
(74) *Attorney, Agent, or Firm* — Studebaker & Brackett PC

(57) ABSTRACT

A master base station according to embodiment divides a bearer of a mobile station into two split bearers in a dual connectivity scheme. One split bearer is provided between the master base station and the mobile station without intervention of a secondary base station. Another split bearer is provided between the master base station and the mobile station with the intervention of a secondary base station. The master base station comprises a transmitter configured to transmit to the mobile station, information indicating
(Continued)

whether the mobile station should transmit uplink data to the master station or to the secondary base station.

7 Claims, 19 Drawing Sheets

(51) Int. Cl.
| | |
|---|---|
| *H04L 5/00* | (2006.01) |
| *H04W 72/12* | (2009.01) |
| *H04W 16/24* | (2009.01) |
| *H04W 88/06* | (2009.01) |

(52) U.S. Cl.
CPC ....... *H04W 72/1268* (2013.01); *H04W 88/06* (2013.01)

(58) Field of Classification Search
CPC ....... H04B 7/2612; H04B 7/02; H04W 88/06; H04W 76/15; H04W 72/0413; H04W 16/14; H04W 28/0278; H04W 28/08; H04W 72/1215; H04W 24/02; H04W 36/08; H04W 72/04; H04W 84/045; H04W 36/0055; H04W 72/02; H04W 84/12; H04W 28/085; H04W 8/24; H04W 36/0022; H04W 36/0033; H04W 16/24; H04W 72/1268; H04W 72/1284; H04W 72/1252; H04W 76/12; H04W 28/0252; H04W 72/0446; H04W 72/0453; H04W 72/0486; H04W 16/32; H04W 28/06; H04W 28/12; H04W 36/023; H04W 76/34; H04W 28/02; H04W 28/0289; H04W 28/18; H04W 36/02; H04W 36/22; H04W 48/18; H04W 76/20; H04W 76/22; H04W 76/30; H04W 24/04; H04W 28/0273; H04W 28/0284; H04W 52/146; H04W 72/10; H04W 72/1221; H04W 72/1231; H04W 72/1242; H04W 72/1247; H04W 36/0027; H04W 36/0066; H04W 36/0069; H04W 40/24; H04W 48/20; H04W 76/36; H04L 5/001; H04L 47/30; H04L 1/1812; H04L 29/08; H04L 47/14; H04L 49/3072; H04L 5/003; H04L 1/1835; H04L 5/00; H04L 43/16; H04L 45/245; H04L 12/6418; H04L 1/1874; H04L 43/0876; H04L 43/0882; H04L 43/0888; H04L 47/122; H04L 47/125; H04L 47/127; H04L 47/24; H04L 47/41; H04L 47/6215; H04L 47/6255; H04L 47/823; H04L 67/14
See application file for complete search history.

(56) References Cited

U.S. PATENT DOCUMENTS

| | | |
|---|---|---|
| 2013/0176988 A1 | 7/2013 | Wang et al. |
| 2015/0230225 A1 | 8/2015 | Uchino et al. |
| 2015/0327236 A1* | 11/2015 | Lin ................... H04W 72/0406 370/329 |
| 2016/0174210 A1* | 6/2016 | Lee ................... H04W 72/1284 370/329 |
| 2016/0234714 A1* | 8/2016 | Basu Mallick ..... H04W 28/085 |
| 2016/0242193 A1* | 8/2016 | Hong .................... H04W 76/10 |
| 2016/0255537 A1 | 9/2016 | Uchino et al. |
| 2016/0262149 A1 | 9/2016 | Futaki et al. |
| 2016/0286429 A1* | 9/2016 | Chen ................ H04W 72/1284 |
| 2017/0111911 A1 | 4/2017 | Uchino et al. |

FOREIGN PATENT DOCUMENTS

| | | |
|---|---|---|
| JP | 2013-187631 A | 9/2013 |
| JP | 2015-142302 A | 8/2015 |
| WO | 2011/100492 A1 | 8/2011 |
| WO | 2014/034416 A1 | 3/2014 |
| WO | 2015/020344 A1 | 2/2015 |
| WO | 2015/159879 A1 | 10/2015 |

OTHER PUBLICATIONS

Written Opinion issued in PCT/JP2015/058583; dated Jun. 23, 2015.
3rd Generation Partnership Project; Technical Specification Group Radio Access Network; Study on Small Cell enhancements for E-UTRA and E-UTRAN; Higher layer aspects; 3GPP TR 36.842 V12.0.0; Dec. 2013; pp. 1-71; Release 12; 3GPP Organizational Partners.
MediaTek Inc.; BSR and LCP for Dual Connectivity; 3GPP TSG-RAN2 #85 Meeting; R2-140197; Feb. 10-14, 2014; pp. 1-4; Prague, Czech Republic.
Intel Corporation; BSR Transmission for Dual Connected UEs; 3GPP TSG-RAN2 Meeting #84; R2-134281; Nov. 11-15, 2013; pp. 1-5; San Francisco, USA.
Panasonic; Logical channel prioritization for dual connectivity; 3GPP TSG RAN WG2 #84; R2-133943; Nov. 11-15, 2013; pp. 1-4; San Francisco, USA.
Panasonic; BSR Reporting Options for Dual Connectivity; 3GPP TSG RAN WG2 Meeting #84; R2-133935; Nov. 11-15, 2013; pp. 1-5; San Francisco, USA.
Partial Supplementary European Search Report dated Oct. 26, 2017, from corresponding EP Appl No. 15765253.8, 20 pp.
Pantech, "Considerations on signaling for separated DRA function," 3GPP TSG RAN WG2 Meeting #83, R2-132503, Barcelona, Spain, Aug. 19-23, 2013, 5 pp.
An Office Action mailed by the Japanese Patent Office dated Jul. 11, 2017, which corresponds to Japanese Patent Application No. 2016-508834 and is related to U.S. Appl. No. 15/127,144; with English Concise Explanation.
Kyocera; "User plane aspects to support uplink split bearer"; 3GPP TSG-RAN WG2 #85-bis; R2-141392; Mar. 31-Apr. 4, 2014; total 6 pages; Valencia, Spain.
Ericsson; "RRC procedures and L2 handling in dual connectivity"; 3GPP TSG-RAN WG2 #87; Tdoc R2-143505; Aug. 18-22, 2014; total 6 pages; Dresden, Germany.
Kyocera; "User plane aspects to support uplink split bearer"; 3GPP TSG-RAN WG2 #89-bis; R2-151539; Apr. 20-24, 2015; total 5 pages; Bratislava, Slovakia.
Huawei, HiSilicon; "User Plane Enhancement for Uplink Bearer Split"; 3GPP TSG-RAN WG2 Meeting #89bis; R2-151180; Apr. 20-24, 2015; total 8 pages; Bratislava, Slovakia.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12); 3GPP TS 36.300 V12.5.0; Mar. 2015; pp. 1-251; 3GPP Organizational Partners.

* cited by examiner

FIG. 7(a)
Values of LCID for UL-SCH
| Index | LCID values |
|---|---|
| 10110 | Truncated BSR for Split Bearer |
| 10111 | Short BSR for Split Bearer |
| 11000 | Long BSR for Split Bearer |
FIG. 7(b)
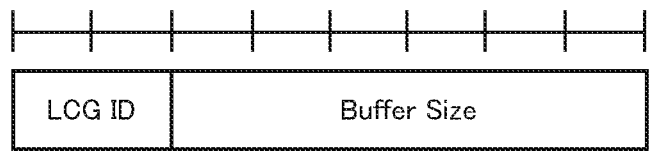
FIG. 7(c)
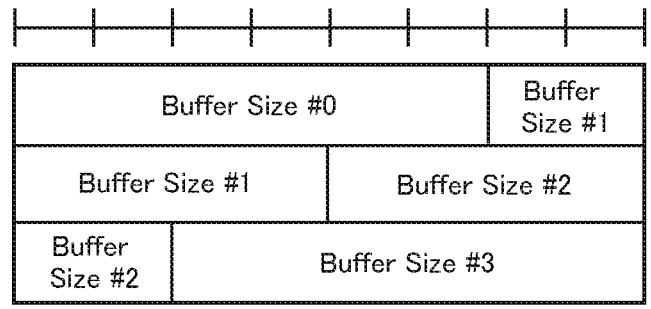

FIG. 8(a)

Values of LCID for UL-SCH

| Index | LCID values |
|---|---|
| 10101 | PDCP BSR |

FIG. 8(b)

PDCP BSR MAC control element

| R | R | PDCP Buffer Size |
|---|---|---|

FIG. 9

```
                    LogicalChannelConfig information element
-- ASN1START

LogicalChannelConfig ::=            SEQUENCE {
    ul-SpecificParameters               SEQUENCE {
        priority                            INTEGER (1..16),
        prioritisedBitRate                  ENUMERATED {
                                                kBps0, kBps8, kBps16, kBps32,
kBps64, kBps128,
                                                kBps256, infinity, kBps512-v1020,
kBps1024-v1020,
                                                kBps2048-v1020, spare5, spare4,
spare3, spare2,
                                                spare1},
        bucketSizeDuration                  ENUMERATED {
                                                ms50, ms100, ms150, ms300, ms500,
ms1000, spare2,
                                                spare1},
        splitBearerTolerance                ENUMERATED {
                                                ms10, ms20, ms100, ms300,...}
        logicalChannelGroup                 INTEGER (0..3)              OPTIONAL
    }       OPTIONAL,
    ...,
    [[ logicalChannelSR-Mask-r9         ENUMERATED {setup}      OPTIONAL
    ]]
}

-- ASN1STOP
```

FIG. 18(a)

| Bit | Description |
|---|---|
| 0 | Control PDU |
| 1 | Data PDU |

FIG. 18(b)

| Bit | Description |
|---|---|
| 000 | PDCP status report |
| 001 | Interspersed ROHC feedback packet |
| 010 | PDCP Buffer Status Report |
| 011 | PDCP UL direction grant |
| 100-111 | reserved |

FIG. 18(c)

| Bit | Description |
|---|---|
| 0 | MCG |
| 1 | SCG |

FIG. 19

```
                LogicalChannelConfig information element
-- ASN1START

LogicalChannelConfig ::=         SEQUENCE {
    ul-SpecificParameters            SEQUENCE {
        priority                         INTEGER (1..16),
        prioritisedBitRate               ENUMERATED {
                                             kBps0, kBps8, kBps16, kBps32,
kBps64, kBps128,
                                             kBps256, infinity, kBps512-v1020,
kBps1024-v1020,
                                             kBps2048-v1020, spare5, spare4,
spare3, spare2,
                                             spare1},
        bucketSizeDuration               ENUMERATED {
                                             ms50, ms100, ms150, ms300, ms500,
ms1000, spare2,
                                             spare1},
        SplitRatio                       ENUMERATED {
                                             1:9, 2:8, 3:7, 4:6, 5:5, 6:4, 7:3,
8:2, 9:1}       OPTIONAL
        logicalChannelGroup              INTEGER(0..3)         OPTIONAL
    }       OPTIONAL,
    ...,
    [[ logicalChannelSR-Mask-r9        ENUMERATED {setup}    OPTIONAL
    ]]
}

-- ASN1STOP
```

MASTER BASE STATION, MOBILE STATION, AND COMMUNICATION CONTROL METHOD

TECHNICAL FIELD

The present invention relates to a master base station, a mobile station and a communication control method used in a mobile communication system.

BACKGROUND ART

In 3GPP (3rd Generation Partnership Project), which is a project aiming to standardize a mobile communication system, introduction of a dual connectivity scheme (Dual connectivity) in Release 12 and thereafter is planned (see Non Patent Document 1). In the dual connectivity scheme, a mobile station receives user data from a plurality of base stations. To the mobile station, a radio resource is assigned from each base station, and thus, it is possible to expect an improvement in throughput.

The dual connectivity scheme is considered on the assumption that it is applied to transmission and reception of downlink data, and of a plurality of base stations that establish a connection with a mobile station, one base station (hereinafter, referred to as "master base station") only establishes an RRC connection with the mobile station. On the other hand, of the plurality of base stations, another base station (hereinafter, called "secondary base station") provides an additional radio resource to the mobile station without establishing an RRC connection with the mobile station. That is, it is considered on the assumption that the master base station provides all the functions necessary for the communication between the master base station and the mobile station, and the secondary base station provides only a function necessary for transmitting the user data. It is noted that the dual connectivity scheme may also be called an inter-base station carrier aggregation (inter-eNB CA).

PRIOR ART DOCUMENTS

Non Patent Document

[Non Patent Document 1] 3GPP technical report "TR 36.842 V12.0.0" Jan. 7, 2014

SUMMARY

A master base station according to one embodiment divides a bearer of a mobile station into two split bearers in a dual connectivity scheme. One split bearer is provided between the master base station and the mobile station without intervention of a secondary base station. Another split bearer is provided between the master base station and the mobile station with the intervention of a secondary base station. The master base station comprises a transmitter configured to transmit to the mobile station, information indicating whether the mobile station should transmit uplink data to the master station or to the secondary base station.

A mobile station according to one embodiment is connected to a master base station in a dual connectivity scheme. One split bearer is provided between the master base station and the mobile station without intervention of a secondary base station. Another split bearer is provided between the master base station and the mobile station with the intervention of a secondary base station. The mobile station comprises a receiver configured to receive from the master station, information indicating whether the mobile station should transmit uplink data to the master station or to the secondary base station.

A communication control method according to one embodiment comprises a step of transmitting, by a mobile station which is capable of transmitting uplink data of a split bearer by using a first radio base station and a second radio base station, first data belonging to the split bearer to the first radio base station and second data belonging to the split bearer to the second radio base station; a step of transferring, by the second radio base station, the second data to the first radio base station; and a step of performing, by the first radio base station, order control on the first data and the second data. The communication control method further comprises a step of notifying, by the mobile station, the second radio base station of control information used for resource assignment for transmission of the second data. The control information is configured to be able to recognize that the second data on which the resource assignment is performed belongs to the split bearer.

A communication control method according to one embodiment comprises a step of transmitting, by a mobile station which is capable of transmitting uplink data of a split bearer by using a first radio base station and a second radio base station, first data belonging to the split bearer to the first radio base station and second data belonging to the split bearer to the second radio base station; a step of transferring, by the second radio base station, the second data to the first radio base station; and a step of performing, by the first radio base station, order control on the first data and the second data. The communication control method further comprises a step of controlling, by the mobile station, for preferentially transmitting the second data, in a MAC layer.

A communication control method according to one embodiment comprises a step of transmitting, by a mobile station configured to transmit uplink data of a split bearer by using a first radio base station and a second radio base station, first data belonging to the split bearer to the first radio base station and second data belonging to the split bearer to the second radio base station; a step of transferring, by the second radio base station, the second data to the first radio base station; and a step of performing, by the first radio base station, order control on the first data and the second data. The first radio base station notifies the second radio base station of a permissive processing time of the order control.

A communication control method according to one embodiment comprises: a step of transmitting, by a mobile station configured to transmit uplink data of a split bearer by using a first radio base station and a second radio base station, first data belonging to the split bearer to the first radio base station and second data belonging to the split bearer to the second radio base station; a step of transferring, by the second radio base station, the second data to the first radio base station; and a step of performing, by the first radio base station, order control on the first data and the second data. The communication control method further comprises: a step of deciding, by the mobile station, a transmission ratio of the first data and the second data, and a step of transmitting, by the mobile station, the first data and the second data, according to the transmission ratio.

BRIEF DESCRIPTION OF DRAWINGS

FIGS. 7(a) to 7(c) are diagrams showing an example of a signal format (Buffer Status Report) according to the first embodiment.

FIGS. 8(a) and 8(b) are diagrams showing an example of a signal format (Buffer Status Report) according to the first embodiment.

FIG. 9 is a diagram showing a signal format (permissive delay amount notification) according to the first embodiment.

FIGS. 18(a) to 18(c) are diagrams showing a setting value of the signal format according to the second embodiment.

FIG. 19 is a diagram of a signal format (transmission ratio setting) according to the second embodiment.

DESCRIPTION OF THE EMBODIMENT

Overview of the Embodiments

Figure 1:
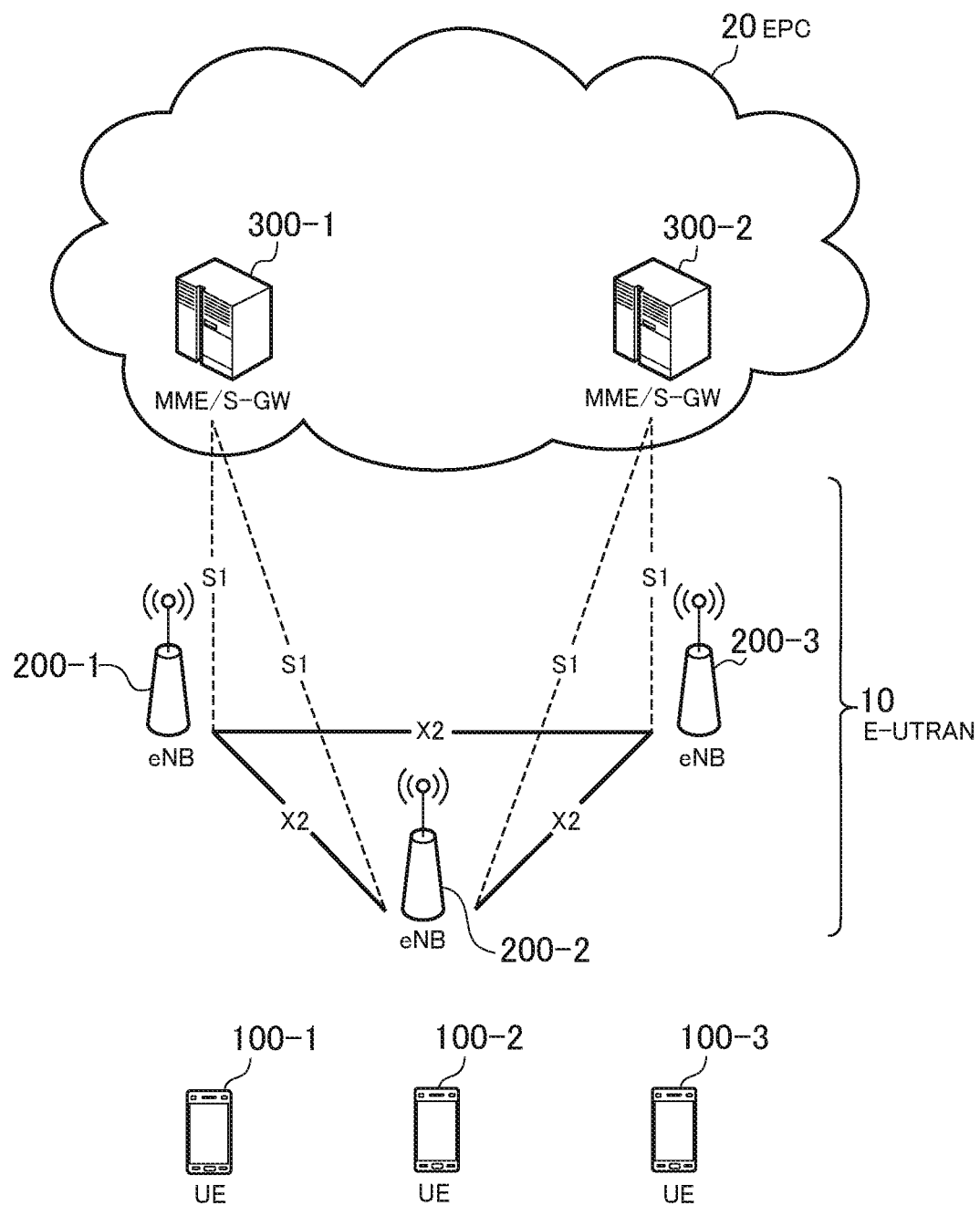
FIG. 1 is a configuration diagram of an LTE system according to a first embodiment and a second embodiment.

Application of a dual connectivity scheme to downlink data transmission has been considered; however, there is no consideration as to the application of the dual connectivity scheme to uplink data transmission. Thus, to improve the throughput of the uplink data transmission, it is considered that there is a need of clarifying a method of applying the dual connectivity scheme.

Therefore, embodiments provide a communication control method with which it is possible to appropriately perform dual connectivity communication in uplink data transmission.

A master base station according to the embodiments divides a bearer of a mobile station into two split bearers in a dual connectivity scheme. One split bearer is provided between the master base station and the mobile station without intervention of a secondary base station, and another split bearer is provided between the master base station and the mobile station with the intervention of a secondary base station. The master base station comprises a transmitter configured to transmit to the mobile station, information indicating whether the mobile station should transmit uplink data to the master station or to the secondary base station.

A mobile station according to the embodiments is connected to a master base station in a dual connectivity scheme. One split bearer is provided between the master base station and the mobile station without intervention of a secondary base station, and another split bearer is provided between the master base station and the mobile station with the intervention of a secondary base station. The mobile station comprises a receiver configured to receive from the master station, information indicating whether the mobile station should transmit uplink data to the master station or to the secondary base station.

A communication control method according to the embodiments comprises: a step of transmitting, by a mobile station which is capable of transmitting uplink data of a split bearer by using a first radio base station and a second radio base station, first data belonging to the split bearer to the first radio base station and second data belonging to the split bearer to the second radio base station; a step of transferring, by the second radio base station, the second data to the first radio base station; and a step of performing, by the first radio base station, order control on the first data and the second data. The communication control method further comprises a step of notifying, by the mobile station, the second radio base station of control information used for resource assignment for transmission of the second data. The control information is configured to be able to recognize that the second data on which the resource assignment is performed belongs to the split bearer.

In the embodiments, the control information is an uplink radio resource assignment request. The uplink radio resource assignment request includes a split bearer identifier or be applied a dedicated format for the split bearer.

In the embodiments, the control information is a status report indicating an amount of the second data stored in a transmission buffer region of the mobile station. The status report includes an identifier indicating the split bearer.

A communication control method according to the embodiments comprises: a step of transmitting, by a mobile station which is capable of transmitting uplink data of a split bearer by using a first radio base station and a second radio base station, first data belonging to the split bearer to the first radio base station and second data belonging to the split bearer to the second radio base station; a step of transferring, by the second radio base station, the second data to the first radio base station; and a step of performing, by the first radio base station, order control on the first data and the second data. The communication control method further comprises a step of controlling, by the mobile station, for preferentially transmitting the second data, in a MAC layer.

In the embodiments, in the step of controlling, the mobile station categorizes the second data to a high-priority logical channel group out of logical channel groups.

The communication control method according to the embodiments further comprises a step of notifying, by the first radio base station, the mobile station of a permissive delay amount defined according to a permissive processing time of the order control.

A communication control method according to the embodiments comprises: a step of transmitting, by a mobile station configured to transmit uplink data of a split bearer by using a first radio base station and a second radio base station, first data belonging to the split bearer to the first radio base station and second data belonging to the split bearer to the second radio base station; a step of transferring, by the second radio base station, the second data to the first radio base station; and a step of performing, by the first radio base station, order control on the first data and the second data. The first radio base station notifies the second radio base station of a permissive processing time of the order control.

A communication control method according to the embodiments comprises: a step of transmitting, by a mobile station configured to transmit uplink data of a split bearer by using a first radio base station and a second radio base station, first data belonging to the split bearer to the first radio base station and second data belonging to the split bearer to the second radio base station; a step of transferring, by the second radio base station, the second data to the first radio base station; and a step of performing, by the first radio base station, order control on the first data and the second data.

The communication control method further comprises a step of deciding, by the mobile station, a transmission ratio of the first data and the second data; and a step of transmitting, by the mobile station, the first data and the second data, according to the transmission ratio.

In the embodiments, the mobile station further establishes a bearer different from the split bearer with at least one of the first radio base station or the second radio base station. The mobile station has a first PDCP function associated with the split bearer and a second PDCP function of the mobile station associated with the different bearer. The communication control method further comprises a step of getting, by the first PDCP function, an uplink data amount stored in a transmission buffer region of the second PDCP function from the second PDCP function; and a step of determining, by the first PDCP function, the transmission ratio on the basis of the uplink data amount got from the second PDCP function.

In the embodiment, the mobile station further establishes a bearer different from the split bearer with at least one of the first radio base station or the second radio base station. The mobile station has a first PDCP function associated with the split bearer, a first MAC function associated with the first radio base station, and a second MAC function associated with the second radio base station. The communication control method further comprises a step of getting, by the first PDCP function, an uplink data amount stored in a transmission buffer region toward the first radio base station and a transmission buffer region toward the second radio base station, from the first MAC function and the second MAC function; and a step of determining, by the first PDCP function, the transmission ratio on the basis of the uplink data amount got from the first MAC function and the second MAC function.

In the embodiments, the mobile station further having an RRC function associated with the split bearer. The communication control method further comprises: a step of reporting, by the first MAC function and the second MAC function, an uplink data amount stored in the transmission buffer region toward the first radio base station and the transmission buffer region toward the second radio base station, to the RRC function; and a step of getting, by the first PDCP function, the uplink data amount stored in the transmission buffer region toward the first radio base station and the uplink data amount stored in the transmission buffer region toward the second radio base station, from the RRC function.

In the embodiments, the mobile station has a transmission buffer region associated with a split bearer. The communication control method further comprises: a step of reporting, by the mobile station, amounts of the first data and the second data stored in the transmission buffer region, to the first radio base station or the second radio base station; and a step of designating, by the first radio base station or the second radio base station, a transmission ratio between the first data and the second data, to the mobile station.

In the embodiments, the mobile station has a transmission timer for counting a time of the uplink data stored in a transmission buffer region. The communication control method further comprising: a step of changing, by the mobile station, a destination of the uplink data remaining in the transmission buffer region from one base station to another base station, when the transmission timer is expired.

In the embodiment, the mobile station has a first timer for counting a time of the uplink data stored in a transmission buffer region toward the first base station, and a second timer for counting a time of the uplink data stored in a transmission buffer region toward the second base station. When one timer of the first timer and the second timer is expired while the other timer is not expired, the mobile station changes a destination of the uplink data remaining in the transmission buffer region to the other base station corresponding to the other timer.

In the embodiments, the mobile station includes a discard timer for counting a time of store in the transmission buffer region. The mobile station discards the uplink data remaining in the transmission buffer region, when the discard timer is expired.

First Embodiment (System Configuration)

FIG. 1 is a configuration diagram of an LTE system according to the first embodiment.

As illustrated in FIG. 1, the LTE system according to the first embodiment comprises UEs (User Equipments) 100, E-UTRAN (Evolved-UMTS Universal Terrestrial Radio Access Network) 10, and EPC (Evolved Packet Core) 20.

The UE 100 corresponds to a mobile station. The UE 100 is a mobile communication device and performs radio communication with a cell (a serving cell). Configuration of the UE 100 will be described later.

The E-UTRAN 10 corresponds to a radio access network. The E-UTRAN 10 includes eNBs 200 (evolved Node-Bs). The eNB 200 corresponds to a radio base station. The eNBs 200 are connected mutually via an X2 interface. Configuration of the eNB 200 will be described later.

The eNB 200 controls a cell or a plurality of cells, and performs radio communication with the UE 100 that establishes a connection with the cell of the eNB 200. The eNB 200, for example, has a radio resource management (RRM) function, a routing function of user data, and a measurement control function for mobility control and scheduling. The "cell" is used as a term indicating a minimum unit of a radio communication area, and is also used as a term indicating a function of performing radio communication with the UE 100.

The EPC 20 corresponds to a core network. The EPC 20 includes MMEs (Mobility Management Entities)/S-GWs (Serving-Gateways) 300. The MME performs various mobility controls, etc., for the UE 100. The S-GW performs transfer control of user data. The MME/S-GW 300 connected to the eNBs 200 *cia* an S1 interface.

Figure 2:
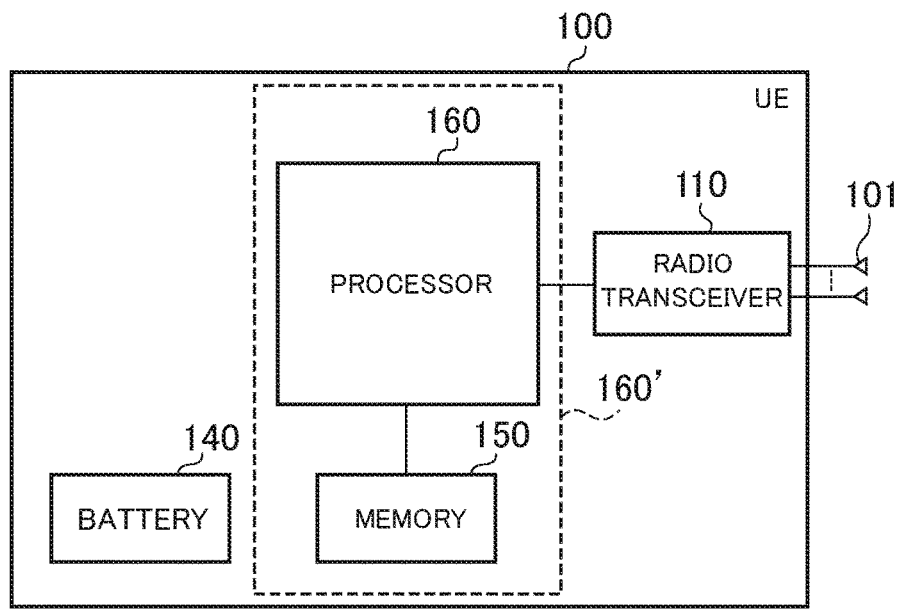
FIG. 2 is a block diagram of UE according to the first embodiment and the second embodiment.

FIG. 2 is a block diagram of the UE 100. As illustrated in FIG. 2, the UE 100 comprises a plurality of antennas 101, a radio transceiver 110, a battery 140, a memory 150, and a processor 160. The memory 150 and the processor 160 constitute a control unit. The memory 150 may be integrally formed with the processor 160, and this set (that is, a chipset) may be called a processor 160'.

The antennas 101 and the radio transceiver 110 are used to transmit and receive a radio signal. The radio transceiver 110 converts a baseband signal (a transmission signal) output from the processor 160 into the radio signal, and transmits the radio signal from the antennas 101. Furthermore, the radio transceiver 110 converts the radio signal received by the antenna 101 into a baseband signal (a reception signal), and outputs the baseband signal to the processor 160.

The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

Figure 3:
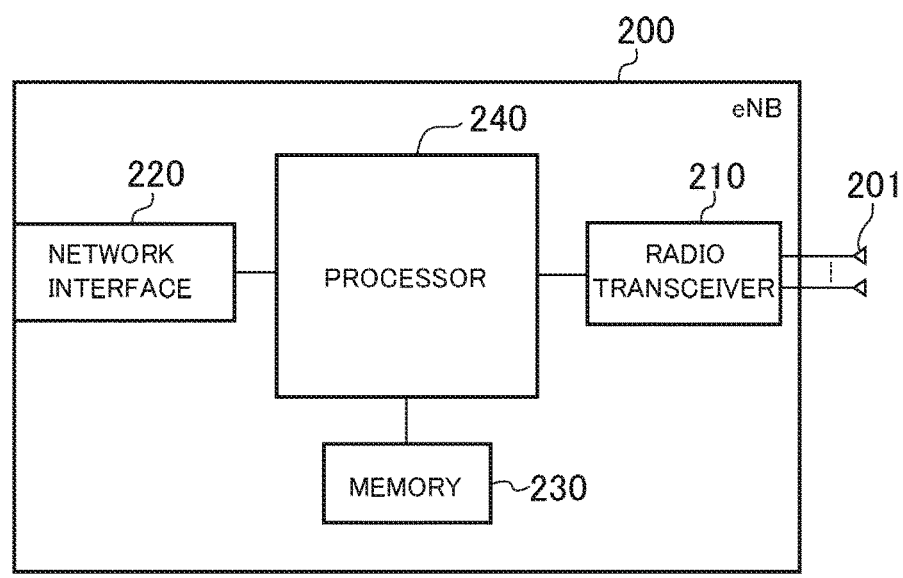
FIG. 3 is a block diagram of eNB according to the first embodiment and the second embodiment.

FIG. 3 is a block diagram of the eNB 200. As illustrated in FIG. 3, the eNB 200 comprises a plurality of antennas 201, a radio transceiver 210, a network interface 220, a memory 230, and a processor 240. The memory 230 and the processor 240 constitute a control unit. The memory 230 may be integrally formed with the processor 240, and this set (that is, a chipset) may be called a processor.

The antennas 201 and the radio transceiver 210 are used to transmit and receive a radio signal. The radio transceiver 210 converts a baseband signal output (a transmission signal) from the processor 240 into the radio signal, and transmits the radio signal from the antenna 201. Furthermore, the radio transceiver 210 converts the radio signal received by the antenna 201 into a baseband signal (a reception signal), and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, and encoding and decoding of the baseband signal and a CPU that performs various processes by executing the program stored in the memory 230. The processor 240 implements various processes and various communication protocols described later.

(Process for User Data)

An LTE system according to the first embodiment supports a dual connectivity scheme in an uplink.

In the dual connectivity scheme, of the plurality of eNBs that establish a connection with the UE 100, only a master eNB (MeNB) 200-1 establishes an RRC connection with the UE 100. On the other hand, the secondary eNB (SeNB) 200-2 of the plurality of eNBs (the other eNB 200) establishes a connection with the UE 100 in a layer that is lower than the RRC layer, and does not establish an RRC connection with the UE 100.

In the dual connectivity scheme, it is considered that the user data belonging to one bearer (bearer 1) is transmitted by using a split bearer.

In the user data control of the split bearer of the dual connectivity scheme, the MeNB 200-1 provides functions of a physical layer, a MAC layer, an RLC layer, and a PDCP layer. On the other hand, the SeNB 200-2 provides functions of a physical layer, a MAC layer, and an RLC layer, and does not provide a function of a PDCP.

An Xn interface is set between the MeNB 200-1 and the SeNB 200-2. The Xn interface is an X2 interface or a new interface. The Xn interface is used for transmitting and receiving a control signal and transmitting and receiving the user data between the MeNB 200-1 and the SeNB 200-2.

The split bearer of the dual connectivity scheme is set to between the UE 100 and the MeNB 200-1 and to between the UE 100 and the MeNB 200-1, via the SeNB 200-2, respectively.

Control of the user data in the dual connectivity scheme in the uplink will be described using FIG. 4 and FIG. 5. It is noted that it is omitted in the figures about the process in the physical layer.

Figure 4:
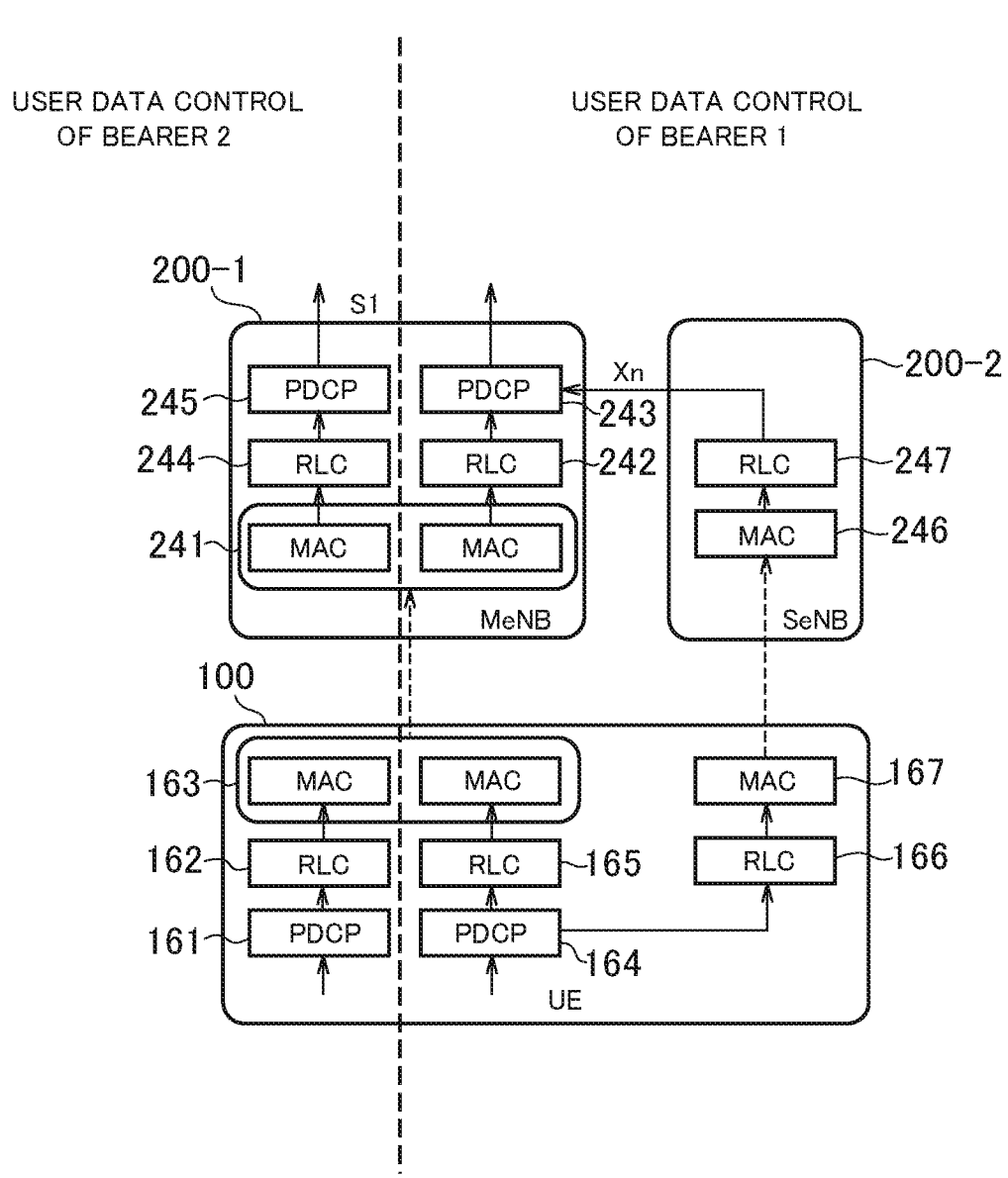
FIG. 4 is a diagram showing an uplink data process of a dual connectivity scheme.

FIG. 4 is a diagram showing user data control of Split Bearer and bearers (a bearer 2 and a bearer 3) of a normal connection scheme. It is noted that the bearer 2 and the bearer 3 (See FIG. 5) may not only be a bearer of a normal connection scheme but also be a non-split bearer studied in Option 1A of the dual connectivity scheme. The UE 100 establishes bearer (bearer 1, bearer 2) that is different from Split Bearer with at least one of the MeNB 200-1 and the SeNB 200-2.

The bearer 1 of the dual connectivity scheme consisting of the two Split Bearers is set so as to be transmitted between the UE 100 and the MeNB 200-1 and from the UE 100 via the SeNB 200-2 to the eNB 200-1. Further, the bearer 2, which is a bearer of a normal connection scheme, is set between the UE 100 and the MeNB 200-1.

The UE 100 includes PDCP functions (161, 164), RLC functions (162, 165, 166), and MAC functions (163, 167). PDCP function 161, RLC function 162 and MAC function 163 are associated with the bearer 2. PDCP function 164, RLC functions 165, 166, and MAC function 167 are associated with the Split Bearer.

The PDCP functions (161, 164) perform a header compression and encryption on an IP packet being user data to generate a PDCP packet (PDCP PDU). Further, the PDCP functions (161, 164) pass the PDCP packet to the RLC functions (162, 165, 166). The PDCP functions (161, 164) are set by each bearer.

The PDCP function 164 of the bearer 1 passes the PDCP packet to the RLC function 165 for transmission to MeNB and the RLC function 166 for transmission to SeNB, which are RLC functions of the bearer 1. On the other hand, the PDCP function 161 of the bearer 2 passes the PDCP packet to the RLC function 162 of the bearer 2.

The RLC functions (162, 165, 166) receive the PDCP packet from the PDCP function, perform a PDCP packet segmentation and a concatenation process on the received PDCP packet, and add an RLC header according to a communication mode to the received PDCP packet to generate an RLC packet (RLC PDC). The RLC functions (162, 165, 166) pass the generated RLC packets to the MAC functions (163, 167).

The RLC functions are set by each bearer in a case of a normal connection scheme. On the other hand, when in a dual connectivity scheme, the RLC functions are set for each split bearer.

The RLC function 162 of the bearer 2 passes the RLC packet to the MAC function 163 for transmission to MeNB. On the other hand, the RLC function 165 for transmission to MeNB, of the bearer 1, passes the RLC packet to the MAC function 163 for transmission to MeNB. The RLC function 166 for transmission to SeNB, of the bearer 1, passes the RLC packet to a MAC function 167 for transmission to the SeNB 200-2.

The MAC functions (163, 167) add a MAC header and padding to the RLC packet to generate a MAC packet. The MAC functions are set for each radio base station at a transmission target. The generated MAC packet is transmitted to the radio base station after performing a process in the physical layer.

The uplink data toward the MeNB 200-1 is transmitted via the MAC function 163 and the uplink data toward the SeNB 200-2 is transmitted via the MAC function 167.

The SeNB 200-2 has a MAC function 246 and an RLC function 247. The MAC function 246 generates the MAC packet from the uplink data received by the SeNB 200-2. Further, the MAC function 246 generates the RLC packet obtained by deleting a header and a padding from the MAC packet, and passes the generated RLC packet to the RLC function 247. The RLC function 247 deletes the RLC header from the RLC packet and performs segmentation and concatenation to generate a PDCP packet. The RLC function 247 transmits the generated PDCP packet to a PDCP function 243 of the master base station.

The MeNB 200-1 has a MAC function 241, RLC functions (242, 244), and PDCP functions (243, 245).

The MAC function 241 generates an RLC packet from the uplink data received by the MeNB 200-1 according to a procedure in much the same way as in the MAC function 246, and passes the generated RLC packet to the RLC functions (242, 244). Specifically, the MAC function 241 passes the RLC packet of the bearer 1 to the RLC function 242, and passes the RLC packet of the bearer 2 to the RLC function 244.

The RLC functions (242, 244) generate the PDCP packet according to a procedure in much the same way as in the RLC function 247, and passes the generated PDCP packet to the PDCP functions (243, 245). Specifically, the RLC function 242 passes the PDCP packet of the bearer 1 to the PDCP function 243, and the RLC function 244 passes the PDCP packet of the bearer 2 to the PDCP function 245.

The PDCP functions (243, 245) perform decompression, decoding on the PDCP packet, and order control thereon, where necessary, to generate an IP packet. The PDCP function 245 of the bearer 2 receives the PDCP packet of the bearer 2, from the RLC function 244, and performs decompression and decoding on the PDCP packet to generate an IP packet of the bearer 2. On the other hand, the PDCP function 243 of the bearer 1 performs decompression, decoding, and order control on the PDCP packet received from the RLC function 242 and the RLC function 247 to generate an IP packet of the bearer 1.

Figure 5:
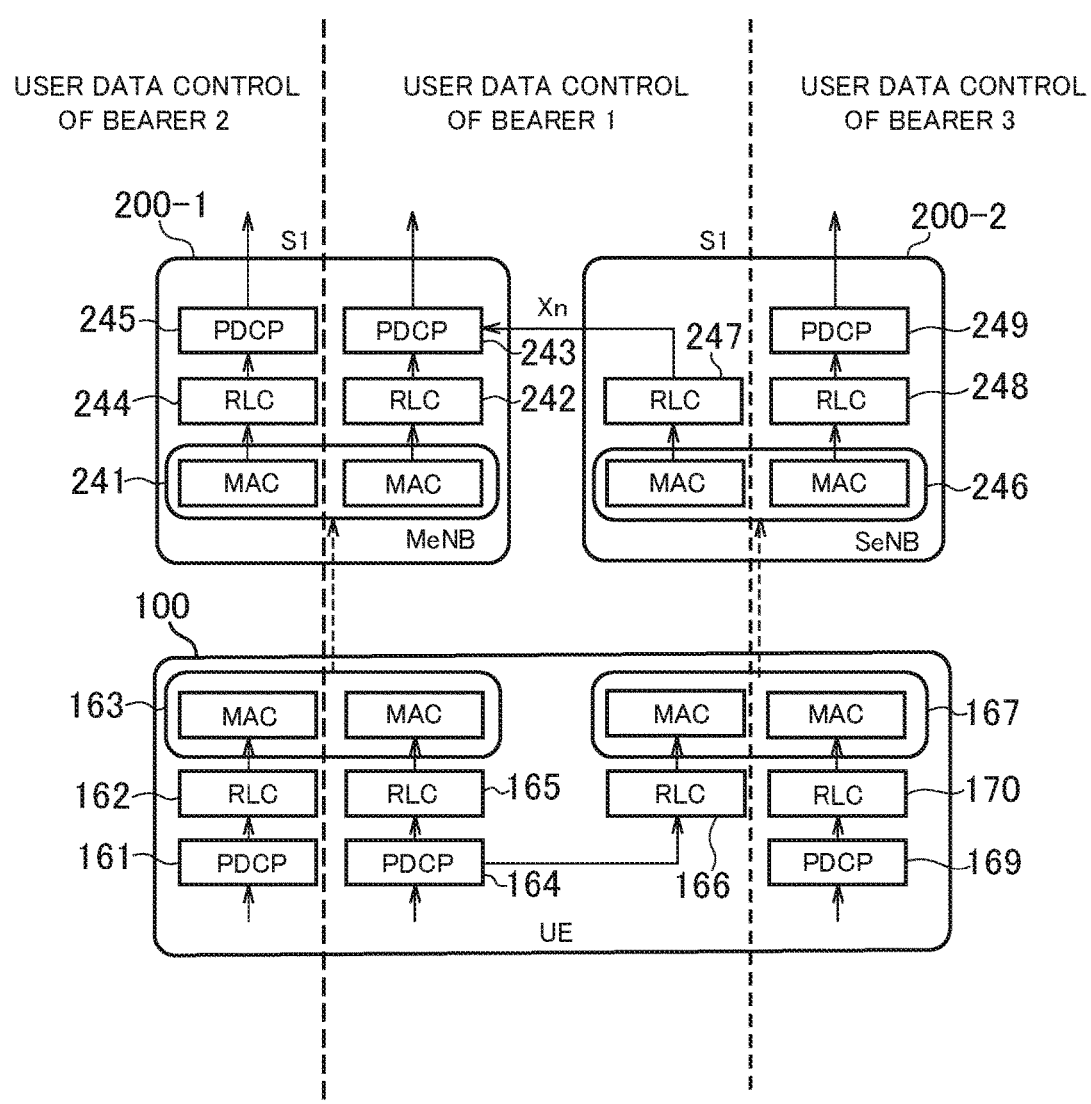
FIG. 5 is a diagram showing an uplink data process of a dual connectivity scheme.

FIG. 5 is a diagram showing an operation where the UE 100 sets the bearer 1 and the bearer 2 similar to FIG. 4, sets the bearer 3 with the SeNB 200-2, and transmits uplink data.

An operation in the transmission process, in the UE 100, of uplink data of the bearer 1 and the bearer 2 and an operation in the reception process in the MeNB 200-1 and the SeNB 200-2 are similar to those in FIG. 4.

The UE 100 has, in addition to a function unit shown in FIG. 4, a PDCP function 169 and an RLC function 170 which are associated with the bearer 3 as a function unit of processing uplink data of the bearer 3. Further, the SeNB 200-2 has a PDCP function 249 and an RLC function 248, as a function unit of processing uplink data of the bearer 3.

A processing content in each function is much the same as those of the bearer 1 and the bearer 2.

The MAC function 167 of the UE 100 performs a process provided by the MAC function of the above-described UE 100 on the RLC packet passed from the RLC function 170 of the bearer 3, in addition to the RLC packet passed from the RLC function 166 of the bearer 1, to generate a MAC packet.

The MAC function 246 of the SeNB 200-2 generates MAC data from the uplink data received by the SeNB 200-2, further generates the RLC packet, and passes the RLC packet to the RLC functions (247, 248). Specifically, the MAC function 246 passes the RLC packet of the bearer 1 to the RLC function 247, and passes the RLC packet of the bearer 3 to the RLC function 248.

(Assignment of Uplink Resource)

The PDCP function 243 of the MeNB 200-1 performs an order control on the PDCP packet of the Split Bearer received from the RLC function 242 and the RLC function 247. In order to keep the load of the order control process of the MeNB 200-1 within a constant range, it is desired that the PDCP function 243 receives the PDCP packet within a predetermined time after the UE 100 transmits the uplink data. For example, it is desired to control so that the PDCP function 243 can receive the PDCP packet of the Split Bearer within a time set by an order control timer (T-reordering) of the PDCP function 243. Thus, the SeNB 200-2 needs to control so that while the uplink data of the Split Bearer and the uplink data of a normal bearer are simultaneously processed in the MAC function 246, the SeNB 200-2 can recognize the uplink data of the Split Bearer and assign an appropriate uplink resource. Therefore, the UE 100 can notifies the SeNB 200-2 control information used for resource allocation for transmitting uplink data of the Split Bearer to the SeNB 200-2. The control information is configured to facilitate identifying that uplink data being the target of the resource allocation belongs to the Split Bearer. As described later, the control information is an uplink resource assignment request or a buffer status report.

In the present embodiment, the UE 100 includes an identifier (split bearer identifier) indicating a Split Bearer, into an uplink resource assignment request (Scheduling Request) transmitted to the SeNB 200-2. Thus, the SeNB 200-2 can recognize that there is the data of the Split Bearer in the bearer 1. Further, the SeNB 200-2 can recognize that the data of the Split Bearer is included in Buffer Status Report transmitted after the Scheduling Request. The SeNB 200-2 can perform a resource assignment on the Split Bearer.

Further, a configuration of a message (dedicated format for the split bearer) indicating an uplink resource assignment request for Split Bearer may be newly defined. The UE 100 may request a resource assignment by using the newly defined message configuration. More specifically, the UE 100 may use PUCCH Format for Split Bearer to transmit the resource assignment request to the SeNB 200-2.

In order to perform an appropriate uplink resource assignment on the Split Bearer, the UE 100 uses the Buffer Status Report to the SeNB 200-2 to notify the SeNB 200-2 of an uplink data amount of the Split Bearer stored in a transmission buffer of the UE 100.

Figure 6A:
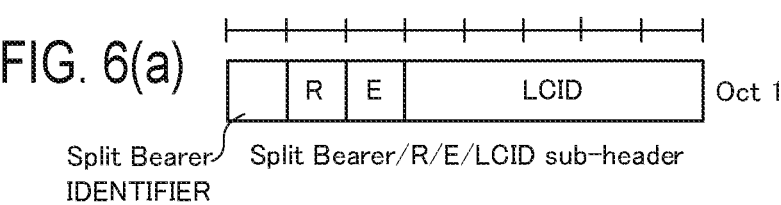
FIGS. 6(a) and 6(b) are diagrams showing an example of a signal format (Buffer Status Report) according to the first embodiment.

More specifically, as shown in FIG. 6(a), a MAC subheader used when the UE 100 transmits a Buffer Status Report message has a region in which the identifier indicating Split Bearer is set. Thus, the SeNB 200-2 can recognize a buffer status of the Split Bearer.

Figure 6B:
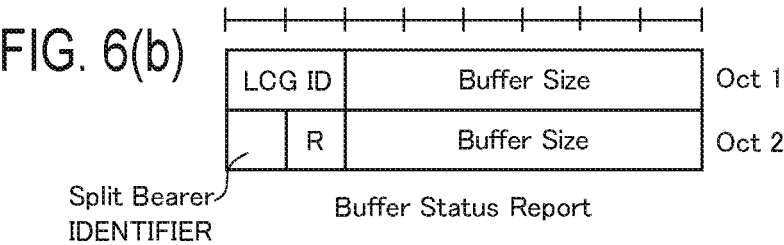

Alternatively, as shown in FIG. 6(b), the UE 100 transmits the Buffer Status Report of the Split Bearer to the SeNB 200-2 by using MCE (MAC Control Element) indicating the Buffer Status Report of the Split Bearer. In either method, the SeNB 200-2 can recognize the buffer status of the Split Bearer.

It is noted that in a case of FIG. 6(b), another buffer for Split bearer may be set to the UE 100, and the UE 100 may perform a buffer status report for Split bearer. Alternatively, the UE 100 may perform a buffering status report of Sprit Bearer data existing within a buffer assigned to the LCG ID.

Further, it may be possible that the SeNB 200-2 assigns an identifier of LCG (Logical Channel Group) to the Split Bearer. Specifically, the SeNB 200-2 assigns the identifier of the LCG to the Split Bearer.

Figure 17A:
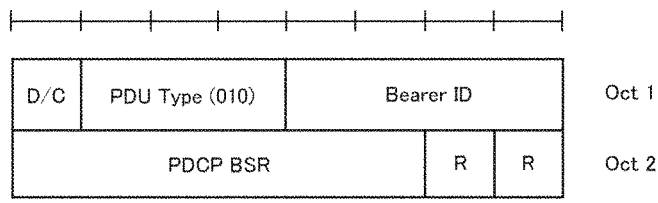
FIGS. 17(a) and 17(b) are diagrams of a signal format (Buffer Status Report) according to the second embodiment.

FIG. 17(a) shows a setting example of LCID (Logical Channel identifier) used for UL-SCH (Uplink-Shared Channel). It is preferable to set at least three types of Buffer Status Reports of the Split Bearer, that is, an truncated Buffer Status Report (Truncated BSR), a short Buffer Status Report (Short BSR), and a long Buffer Status Report (Long BSR).

Figure 17B:
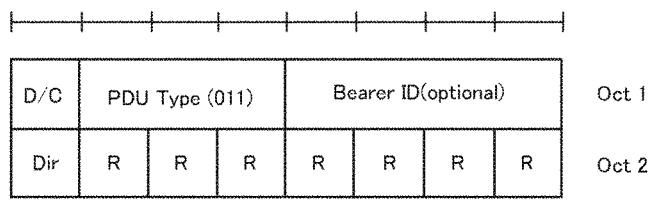

FIG. 17(b) shows a format example of MAC Control Element (MCE) of the truncated Buffer Status Report and the short Buffer Status Report. The two Buffer Status Reports are the same format. Further, FIG. 17(c) shows an example of an MCE format of the long Buffer Status Report.

The UE 100 may report an amount of PDCP packets stored in the transmission buffer. When reporting, the UE 100 sets the identifier of the LCG of the Split Bearer and transmits the Buffer Status Report of the PDCP packet, to the SeNB 200-2. Thus, the SeNB 200-2 can recognize the Buffer Status Report of the Split Bearer. FIGS. 8(a) and 8(b) show a setting example of the LCID used in UL SCH of the Buffer Status Report of the PDCP packet, and a format example of MCE.

(Priority Control)

The UE 100 and the SeNB 200-2 may preferentially process the uplink data transmitted via the SeNB 200-2 over other data. Thus, the PDCP function 243 of the Split Bearer can receive the uplink data within a predetermined time.

For example, the UE 100 sets a LCP (Logical Channel Priority) of the uplink data of the Split Bearer to a high priority. That is, the UE 100 categorizes the uplink data of the Split Bearer to a high-priority logical channel group out of logical channel groups. Thus, the UE 100 can preferentially transmit the uplink data of the Split Bearer to the SeNB 200-2, and the PDCP function 243 can receive the uplink data within a predetermined time.

The PDCP function 164 notifies the MAC function 167 of information with which it is possible to recognize the uplink data of the Split Bearer. For example, the PDCP function 164 notifies the MAC function 167 of information with which it is possible to recognize the RLC function 166 and of information with which it is possible to recognize the PDCP function 164. Thus, the MAC function 167 can set the LCP of the uplink data of the Split Bearer to a high priority.

Further, the MeNB 200-1 notifies the UE 100 of a permissive delay amount of the PDCP function 243 of the Split Bearer. The permissive delay amount is determined according to permissive time of order control. The UE 100 transmits the uplink data of the Split Bearer to the SeNB 200-2 so as to fall within the notified permissive delay amount. For example, in the RRC procedure of the MeNB 200-1 and the UE 100, the MeNB 200-1 notifies the UE 100 of the permissive delay amount by using an information element (Logical Channel Config information element) for which LCP information is set. As shown in FIG. 9, the MeNB 200-1 may inform the UE 100 of the permissive delay amount by using an information element "Split Bearer Tolerance" of a permissive delay amount of uplink data.

Further, so that the SeNB 200-2 can transmit the PDCP packet of the Split Bearer to the MeNB 200-1 within a predetermined time, the MeNB 200-1 notifies the SeNB 200-2 of a permissive processing time of the order control. More specifically, the MeNB 200-1 notifies the SeNB 200-2 of a timer value of the order control timer. The SeNB 200-2 performs the uplink data process of the Split Bearer so that the PDCP function 243 can receive the PDCP packet of the Split Bearer within a range of the notified timer value. At this time, the SeNB 200-2 performs the uplink data process of the Split Bearer by taking into account also a delay (X2) delay in data transfer between the MeNB 200-1 and the SeNB 200-2.

Figure 10:
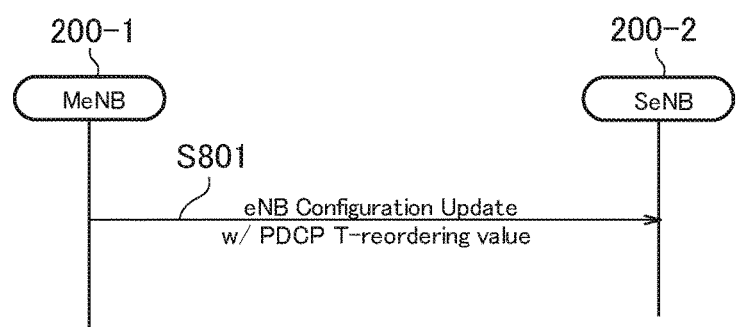
FIG. 10 is a diagram of a sequence (sequence control timer notification) according to the first embodiment.

A notification sequence of the timer value of the order control timer is shown in FIG. 10. The MeNB 200-1 notifies the SeNB 200-2 of a value of the order control timer (PDCP T-reordering value) by using an eNB Configuration update message (S801).

It is noted that the timer value may be (A) the same value of T-reordering of MeNB, (B) T-reordering-X2 delay amount of MeNB, and (C) a timer value (permissive processing time) set to T-reordering-UE of MeNB, or a combination thereof.

Second Embodiment

A communication control method according to a second embodiment will be described while focusing on the differences from the first embodiment, below.

(Control of Transmission Ratio)

The UE 100 decides whether the UE 100 transmits the uplink data of the Split Bearer to the MeNB 200-1 or the SeNB 200-2. More specifically, the PDCP function 164 determines which to choose the RLC function 165 or the RLC function 166 as a destination of the PDCP packet. When the transmission target of the uplink data is determined, the PDCP function 164 determines by taking into account not only a status of the bearer 1 being the Split Bearer but also a status of the bearer 2 set with the MeNB 200-1 and a status of the bearer 3 set with the SeNB 200-2.

Figure 11:
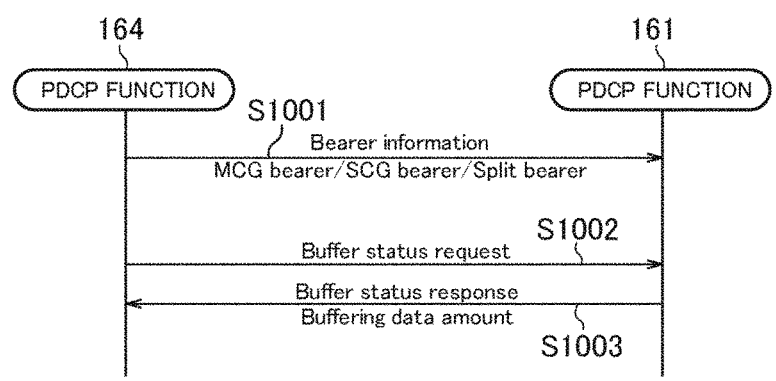
FIG. 11 is a diagram of a sequence (PDCP entity) according to the second embodiment.

The PDCP function 164 exchanges information on an uplink buffer status of each bearer from the PDCP function 161 and the PDCP function 169, and determines the transmission target. For example, as shown in FIG. 11, the PDCP function 164 transmits, to the PDCP function 161, a bearer information notification (S1001 Bearer information) and a buffer status request (S1002 Buffer status request). The PDCP function 161 notifies the PDCP function 164 of a buffer amount of the uplink data stored in a transmission buffer region of the PDCP function 161, that is, an amount of uplink data of the bearer 2 stored in a transmission buffer region, by a buffer status response (S1003 Buffer status response). By this procedure, the PDCP function 164 gets the buffer amount of uplink data of the bearer 1. Further, the PDCP function 164 performs a procedure as much the same way as in the PDCP function 169 of the bearer 3 to get the buffer amount of the uplink data of the bearer 3 stored in the transmission buffer region.

Figure 12:
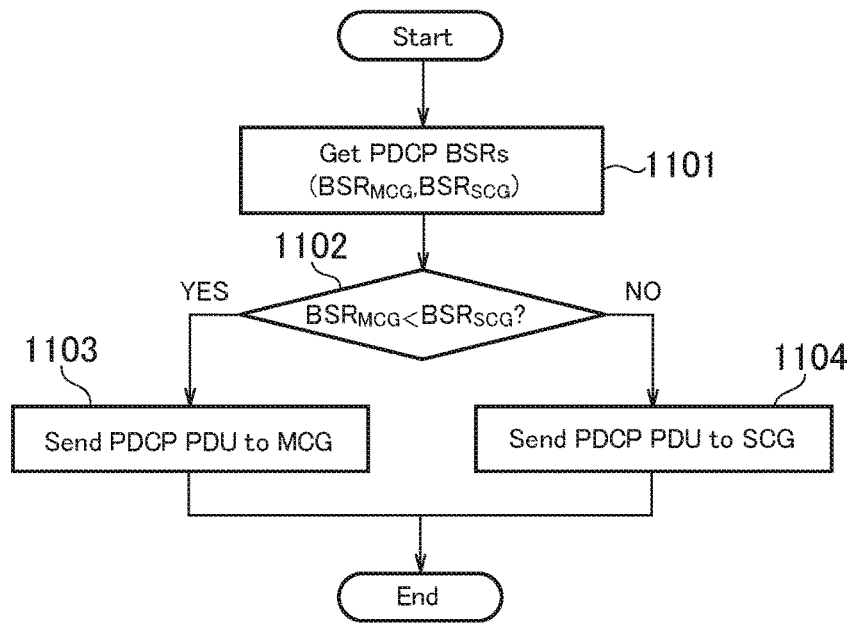
FIG. 12 is a first flowchart according to the second embodiment.
Figure 13:
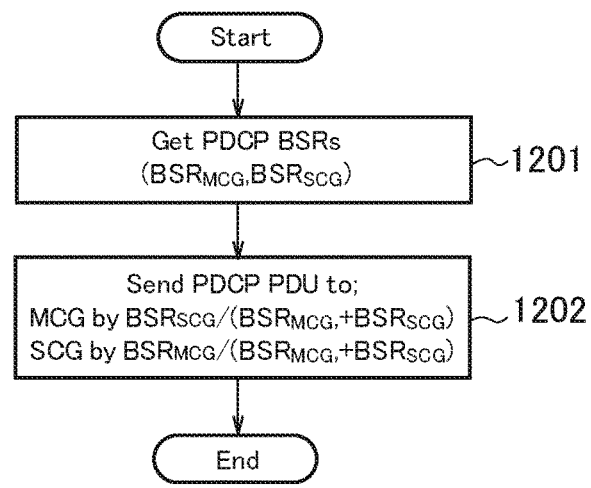
FIG. 13 is a second flowchart according to the second embodiment.

The PDCP function 164 determines the transmission target from the got buffer amount. FIG. 12 and FIG. 13 show an operation example in which the transmission target is determined.

As shown in FIG. 12, the PDCP function 164 gets an uplink buffer amount ($BSR_{MCG}$) from the PDCP function 161, and gets an uplink data buffer amount ($BSR_{SCG}$) from the PDCP function 169 (1101). The PDCP function 164 compares the $BSR_{MCG}$ and the $BSR_{SCG}$ (1102), and transmits the uplink data of the Split Bearer to one in which a buffer amount is smaller (1103, 1104). Thus, the UE 100 can transmit the uplink data by using a radio base station available between the MeNB 200-1 and the SeNB 200-2.

Further, as shown in FIG. 13, the PDCP function 164 gets $BSR_{MCG}$ and $BSR_{SCG}$ (1201), and determines a transmission ratio from the got buffer amount so that the available radio base station is used as much as possible. The UE 100 can also transmit the uplink data of the Split Bearer according to the determined transmission ratio (1202). For example, the PDCP 164 can set to transmit the data at a ratio of "$BSR_{SCG}/(BSR_{MCG}+BSR_{SCG})$" to the MeNB 200-1, and transmit the data at a ratio of "$BSR_{SCG}/(BSR_{MCG}+BSR_{SCG})$" to the SeNB 200-2.

(Getting from MAC Function)

The PDCP function 164 can also get the buffer amount of the uplink data stored in the transmission buffer region, from the MAC functions (163, 167).

Figure 14:
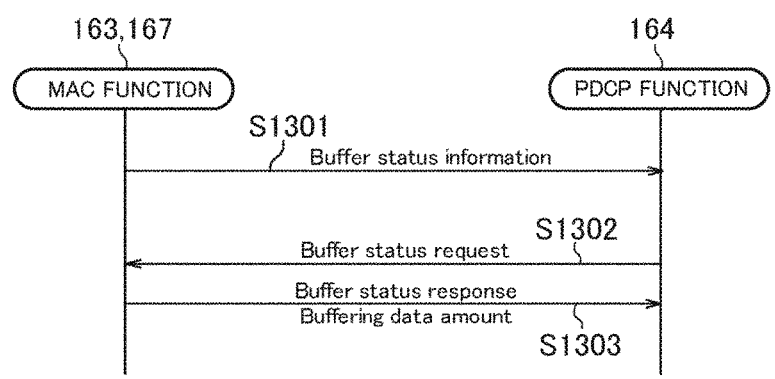
FIG. 14 is a diagram of a sequence (MAC entity) according to the second embodiment.

As shown in FIG. 14, when the PDCP function 164 receives the buffer status information (S1301 Buffer Status Information) from the MAC function 163 for transmission to the MeNB 200-1 and the MAC function 167 for transmission to the SeNB 200-2, the PDCP function 164 transmits the buffer status request (S1302 Buffer Status request) to the MAC function 163 and the MAC function 167. The MAC function 163 and the MAC function 167 transmit, to the PDCP function 164, the uplink data amount stored in the transmission buffer toward each base station, by the buffer status response (S1303 Buffer Status response). As a result, the PDCP function 164 gets the uplink data amount stored in the transmission buffer toward each base station. The PDCP function 164 decides the transmission ratio between to the MeNB 200-1 and to the SeNB 200-2 on the basis of the got uplink data amount.

Figure 15:
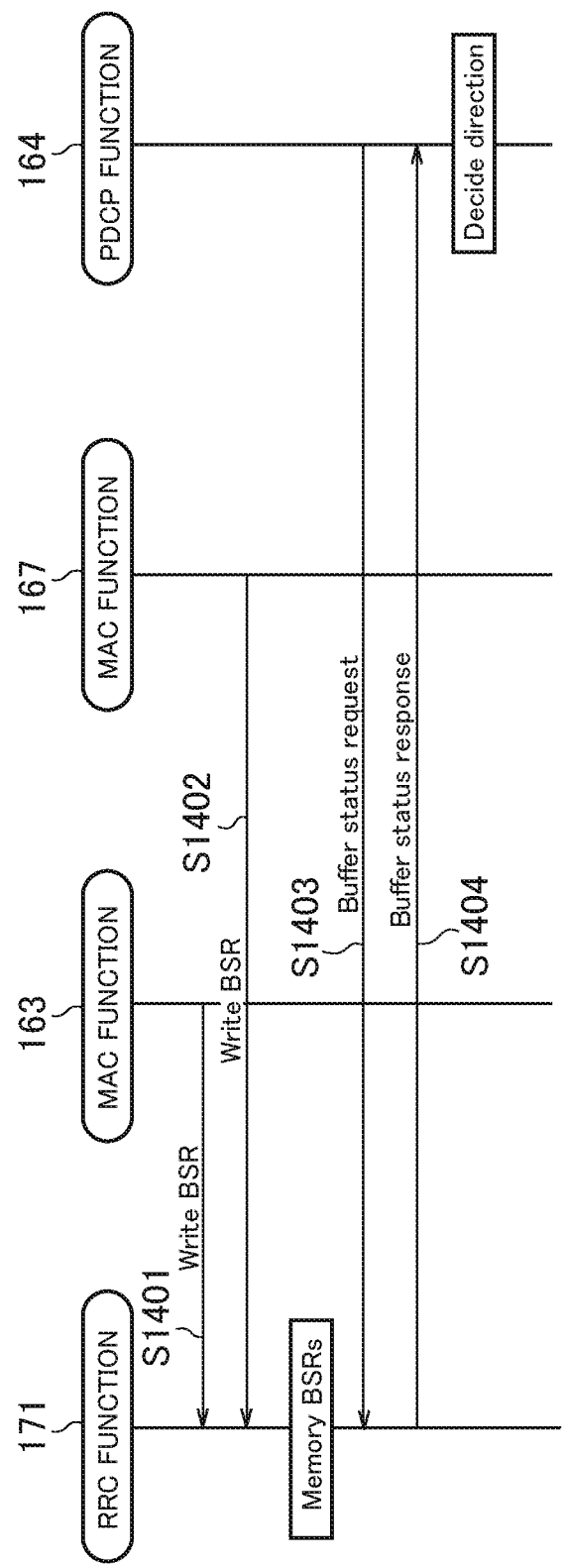
FIG. 15 is a diagram of a sequence (RRC entity) according to the second embodiment.

As shown in FIG. 15, the PDCP function 164 can also get the data amount by way of the RRC function 171. The RRC function 117 is associated with the Split Bearer.

In an embodiment shown in FIG. 15, the MAC function 163 notifies the RRC function 171 of the data amount stored in the transmission buffer region toward the MeNB 200-1, and the MAC function 167 notify the RRC function 171 of the data amount stored in the transmission buffer region toward the SeNB 200-2 (S1401, S1402). The RRC function 171 memorizes the notified data amount. The PDCP function 164 transmits a buffer status request (S1403 Buffer Status request) to the RRC function 171. The RRC function 171 transmits the uplink data amount stored in the transmission buffer toward each base station, by the buffer status response (S1404 Buffer Status response), to the PDCP function. As a result, the PDCP function 164 gets the uplink data amount stored in the transmission buffer toward each base station. The PDCP function 164 decides the transmission ratio between to the MeNB 200-1 and to the SeNB 200-2 on the basis of the got uplink data amount.

After deciding (setting) the transmission ratio, the UE 100 transmits the uplink data for MeNB 200-1 belonging to the Split Bearer and the uplink data for SeNB 200-2 belonging to the Split Bearer, respectively.

(Buffer Status Report by Each Bearer)

The UE 100 may reports a buffer status by each bearer (by each PDCP entity) in order that the MeNB 200-1 or the SeNB 200-2 appropriately sets the transmission ration. The UE 100 has a transmission buffer region associated with the Split Bearer.

Specifically, the MAC functions (163, 167) transmitting the Buffer Status Report by each bearer get a buffer status from the PDCP function 164. At this time, the MAC functions (163, 167) may not receive the RLC packet.

Figure 16:
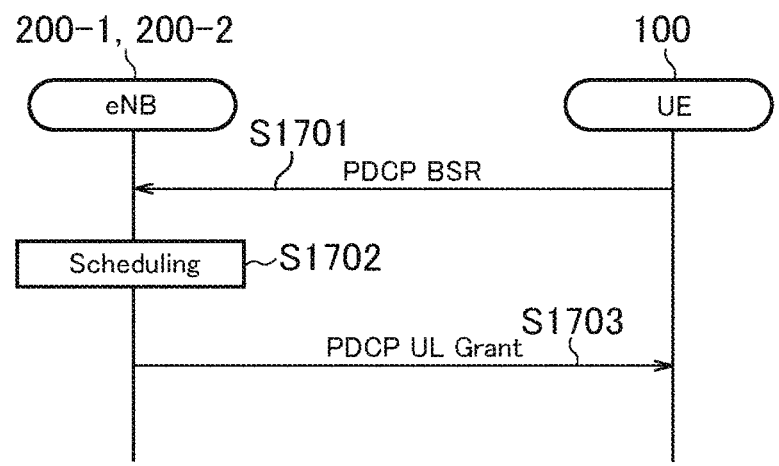
FIG. 16 is a diagram of a sequence (PDCP Buffer Status Report) according to the second embodiment.

Next, as shown in FIG. 16, the UE 100 transmits the uplink data amount of the Split Bearer stored in the transmission buffer region of the PDCP function 164, to the MeNB 200-1 or the SeNB 200-2 (S1701 PDCP BSR). That is, the UE 100 reports the amount of the uplink data stored in the transmission buffer region associated with the Split Bearer to the MeNB 200-1 or the SeNB 200-2. The reported MeNB 200-1 or SeNB 200-2 performs resource assignment for receiving the uplink data from the UE 100 (S1702 Scheduling). It is noted that the MeNB 200-1 or the SeNB 200-2 may perform the resource assignment (S1702 Scheduling) by scheduling of a normal radio resource or may perform scheduling on the transmission-target RLC of the PDCP packet. For the scheduling to the transmission-target RLC, taking into consideration a radio status, etc., there are methods such as (a) setting a ratio between the RLC function 165 toward MeNB 200-1 and the RLC function 166 toward the SeNB 200-2, and (b) setting so that data is transmitted only to the RLC function 165 up to a certain time point.

After the resource assignment, the MeNB 200-1 or the SeNB 200-2 designates a transmission target, and inform the uplink resource (S1703 UL Grant).

The UE 100 reports the buffer status by each bearer, in a format of a message shown in FIG. 17(a). Further, the UL Grant is informed from the MeNB 200-1 or the SeNB 200-2 to the UE 100, in a message format shown in FIG. 17(b).

Here, D/C is an identifier indicating a control signal (Control) or data (Data), and PDU Type indicates a type of Control PDU (010; PDCP BSR, 011; PDCP UL Grant). In a case of the Buffer Status Report, "010" is set, and in a case of the UL Grant, "011" is set. Bearer ID is an identifier of a bearer, and an identifier of a PDCP entity may be set. With respect to PDCP BSR, a table similar to the MCE is set. Dir is information indicating a direction in which the PDCP PDU is transmitted (toward the master eNB 200-1, toward the MCG/SeNB 200-2, SCG), and R denotes Reserve.

It is noted that here the method in which the PDCP control packets are used is described; however, a process via a physical layer, a MAC layer, and an RLC layer may be performed. Further, ratio information between MCG and SCG may be set to the UL Grant.

The transmission ratio between MCG and SCG may be designated in the Dir, other than the transmission direction. For example, a 4-bit format may be used to set a ratio between MCG and SCG, as described below.

0000=0:10
0001=1:9
0010=2:8
0011=3:7
0100=4:6
0101=5:5
1000=10:0
1001=9:1
1010=8:2
1011=7:3
1100=6:4

From 0110 to 0111 and from 1101 to 1111 are reserved.

FIGS. 18(a) to 18(c) show a method of setting each parameter.

The method of performing scheduling by using the UL Grant is described, and it is also possible for the MeNB 200-1 or the SeNB 200-2 to designate a transmission ratio to the UE 100 by the RRC signal.

An example by using the RRC signal is shown in FIG. 19. A parameter "SplitRatio" indicating the transmission ratio of the Split Bearer is newly set to "Logical Channel Config information element" of the RRC signal and the transmission ratio is designated.

In this way, the MeNB 200-1 or the SeNB 200-2 designates the transmission ration of the uplink data to the UE 100-1.

(When not Possible to Transmit within Predetermined Time)

The UE 100 has a transmission timer (PDCP transmission timer) for counting a time of the uplink data stored in the transmission buffer region. The UE 100 changes the radio base station of the transmission target when it is not possible to transmit the uplink data by the time the timer is expired. That is, the UE 100 changes a destination of the uplink data remaining in the transmission buffer region from one eNB 200 to another eNB 200, when the transmission timer is expired. Specifically, when the UE 100 cannot transmit the uplink data toward the MeNB 200-1 by the time the transmission timer is expired, the UE 100 transmits, to the SeNB 200-2, the uplink data that cannot be transmitted. Likewise, when the UE 100 cannot transmit the uplink data toward the SeNB 200-2 by the time the transmission timer is expired, the UE 100 transmits, to the MeNB 200-1, the uplink data that cannot be transmitted.

The UE 100 may have a transmission timer 1 toward MeNB 200-1 (PDCP transmission timer toward MeNB 200-1), and a transmission timer 2 toward SeNB 200-2 (PDCP transmission timer toward SeNB 200-2). The transmission timer 1 counts a time of the uplink data stored in the transmission buffer region toward the MeNB 200-1. The transmission timer 2 counts a time of the uplink data stored in the transmission buffer region toward the SeNB 200-2. The UE 100 changes the transmission target if one timer is expired when the other timer is not expired. That is, the uplink data toward the MeNB 200-1 is changed to that toward the SeNB 200-2, and the uplink data toward the SeNB 200-2 is changed to that toward the MeNB 200-1.

Further, the UE 100 may have a discard timer (PDCP Discard Timer) for counting a time of the uplink data stored in the transmission buffer region, in addition to the transmission timer. The UE 100 discards the uplink data belonging to the Split Bearer remaining in the transmission buffer region, when the discard timer expires. Therefore, The UE 100 changes the transmission target when the transmission timer is expired, and discards the untransmitted uplink data when the discard timer is expired.

As a result, the UE 100 can transmit the uplink data by using the uplink resource of the radio base station that is not previously set as the transmission target without discarding the uplink data when the transmission timer is expired.

Other Embodiments

In the Above-Described Embodiments, the Embodiment where the UE 100 performs dual connectivity by using the MeNB 200-1 and one SeNB 200-2 is described; however, the UE 100 may use a similar procedure to perform dual connectivity by using the MeNB 200-1 and a plurality of SeNBs 200-2.

Further, there is no particular limitation on the types of cell of the MeNB 200-1 and the SeNB 200-2 that perform dual connectivity. For example, communication of the dual connectivity scheme may be performed with a combination of a macrocell and a small cell, a combination of a macro cell and a pico cell, a combination of a pico cell and a femto cell, and a combination of a macro cell and a macro cell.

As the SeNB 200-2, an additional radio resource may be added by using a radio base station of another system. For example, an access point of WLAN may be the SeNB 200-2.

Furthermore, in the embodiments described above, although an LTE system is described as an example of a mobile communication system, the present invention is not limited to the LTE system, and may be applied to a system other than the LTE system.

APPENDIX (1) Introduction

For Dual Connectivity, it decided to support two types of user plane architecture, i.e. split bearer and SCG bearer. In this Appendix, the aspects of details of user plane aspects to support uplink split bearer are discussed.

(2) Uplink Structure of Dual Connectivity

Figure 20:
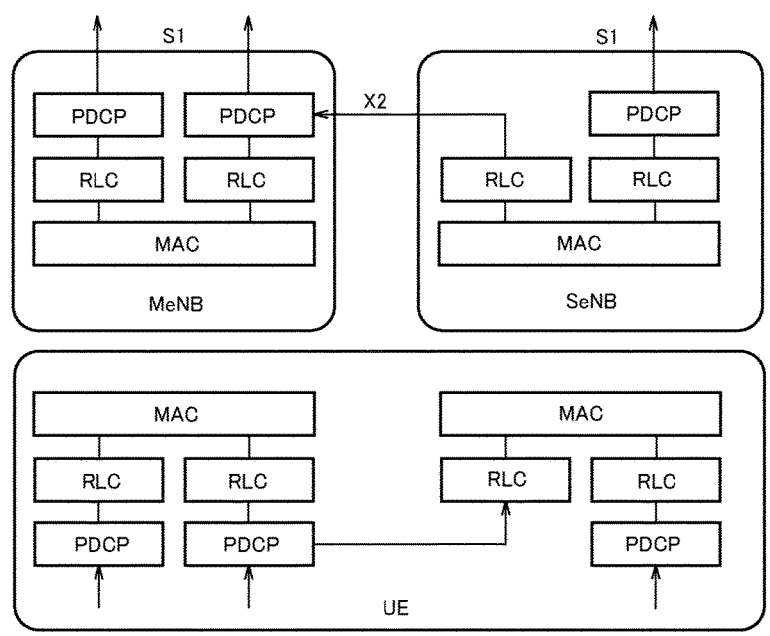
FIG. 20 is an illustration of an example of a possible overall structure of uplink dual connectivity (heaviest assumption).

Taking the agreements into account, the overall structure of uplink dual connectivity can be assumed as FIG. 20.

On the other hand, so far there are some discussion items to support dual connectivity. The following discussion items was identified and it's still remaining.

"Whether some bearers of a UE may be split (3C) while others are served by the SeNB (1A) is a discussion item."

Another item to be discussed for illustrating concrete structure was identified in as follows.

"Whether UL PDCP data of one DRB may be sent towards SCG and MCG (UL split) is a discussion item."

However, supporting split bearer seems to be already common view, according to the below statement.

"From there it naturally follows that in MAC, a split bearer in downlink also appears as a split bearer in uplink: two logical channels with data to send, affecting BSR, LCP and SR in two MAC entities."

Observation 1: Split bearer and SCG bearer being configured in a UE simultaneously is a discussion item.

Observation 2: Split bearer for uplink being supported is a discussion item but seems to be common view.

Therefore, the overall structure assumed in FIG. 20 is not fixed yet, i.e. it's the heaviest assumption at this point. However, in the following discussion we assume the structure as the baseline to consider the worst case for UE.

(3) MAC to Support Uplink Split Bearer (3.1) Scheduling Request and Buffer Status Report As already agreed in RAN2 and illustrated in FIG. 20, MAC entities in the UE are configured per cell group, i.e. one MAC for MCG and one MAC for SCG. The structure allows independent scheduling processes in each eNBs as well as possibly re-using existing mechanisms. Furthermore, in order to maximize the benefit from dual scheduler in dual eNBs, entirely independent operation between two MACs is basically ideal. It also contributes to reducing coordination between two eNBs over X2.

There is no problem with re-using the existing mechanism to support uplink split bearer.

Proposal 1: The existing SR/BSR mechanism should be reused to support UL split bearer.

(3.2) Logical Channel Prioritization and Logical Channel Group

There were two options proposed and discussed, i.e. common bucket and separate bucket. The common bucket option may be beneficial to ensure required QoS of the split bearer since it's not clear how to configure the PBR values in the case of two separate buckets, while the separate bucket option is consistent with the existing mechanism, i.e. no standardization effort as well as ensuring independent process.

The following "RLC UM bearers in split mode is not supported." is agreed.

Assuming that the agreement means GBR bearers are not configured with split bearer, the common bucket option will cause additional complexity in UE implementations, e.g. interactions between each entity, without any significant benefits.

With the separate bucket option, it facilitates independent process and it assumes that QoS control can be handled in higher layer, i.e. PDCP and/or RRC.

Proposal 2: Separate bucket mechanism should be supported for each cell group for UL split bearer.

However, there is the other issue from the viewpoint of network side. As same as UE, MeNB should perform re-ordering process at its PDCP layer which has a limited buffer size for the process, so supporting uplink split bearer should take into account how to handle this.

To avoid buffer overflow at PDCP re-ordering process in MeNB, the uplink packet delivery on split bearer needs to consider different latency performances between the MeNB path and the SeNB path, which is caused by radio conditions, X2 latency and LCP/LCG configurations. Especially the UE cannot know the X2 latency, it should be handled by eNBs, so RRC in the MeNB should carefully define LCP configuration and allocate split bearer to appropriate LCG. However, since the number of LCG is very limited, the eNB(s) may suffer from well-handling of both split bearer and SCG bearer simultaneously. It assumes that some kind of additional rule in LCG configuration or mechanism in LCP will solve the issue. It can be considered the following three options.

1. Assuming the common bucket mechanism;

A) LCG#0 in the MAC for SeNB is used for split bearer with careful logical channel configurations by RRC taking into account the MeNB's re-ordering capabilities, e.g. buffer size and re-ordering timer. With this option, since the SeNB doesn't need to transfer SRBO, the scheduler can fully control the prioritization for LCG#0 which is dedicated to handling split bearer towards the SeNB without significant impacts on the other LCGs that may be used for non-split bearers as well as the specifications.

B) A new optional parameter applicable only to split bearer towards SeNB is introduced. With this option, the MeNB can set the parameter to indicate to the UE an offset for the configuration(s) in LogicalChannelConfig, e.g. the PBR and/or the priority in order to compensate for the latency of data path via the SeNB including X2 latency.

2. Assuming the separate bucket mechanism, there won't be any need of the new parameter mentioned in Option 1-A for the logical channel configurations, since the separate bucket mechanism can support this compensation mechanism thanks to dual LogicalChannelConfig IEs configured by RRC configuration.

Proposal 3: It should discuss how to avoid buffer overflow at PDCP re-ordering process in MeNB.

(4) PDCP to Support Uplink Split Bearer (4.1) Scaling of Two Routes

Data available for transmission was discussed and option 3 which allows possibility of having a capability of data routing function, i.e. the PDCP PDU is delivered towards MCG or SCG, is supported. Actually, the discussion of data available for transmission needs an agreement for baselines on how to handle the scaling between the two routes. It assumes the following two options for the configuration.

1. RRC configuration provides a fixed value of the scaling of the packet-delivering routes, e.g. 30%:70%. This option is simpler way, but it cannot adapt current conditions of both links, e.g. throughput and/or latency, and it needs RRC Connection Reconfiguration to change the value.

2. Scheduler in MeNB provides dynamic/semi-static value of the scaling, taking into account current conditions. This option is more complicated way and needs control overheads, but more gain is expected.

Proposal 4: It should discuss how to handle the scaling between MCG path and SCG path for packet delivering on split bearer.

(4.2) Discard Rule Considering Two Routes

According to current specification, PDCP discard occurs the following conditions;

"When the discardTimer expires for a PDCP SDU, or the successful delivery of a PDCP SDU is confirmed by PDCP status report, the UE shall discard the PDCP SDU along with the corresponding PDCP PDU. If the corresponding PDCP PDU has already been submitted to lower layers the discard is indicated to lower layers."

Obviously, the mechanism assumes one data path, i.e. MCG bearer or SCG bearer in dual connectivity.

Observation 3: The existing PDCP discard mechanism assumes one data path, i.e. can be re-used for MCG bearer and SCG bearer.

Observation 4: It needs to be clarified whether existing PDCP discard mechanism can be reused for split bearer.

Considering split bearer, one of the strong benefits is having two paths to deliver the packet. While, of course, the existing mechanism can work for split bearer, it can enhance the mechanism with the benefit, in order to deliver the packet efficiently and absolutely. For example, it's common understanding that SCG will be typically deployed as small cells, i.e. pico cells or femto cells, and that the radio condition between SCG and UE is more sensitive under moving UE than that between MCG and UE. In the case where UE moves towards the cell edge of the SCG, the PDCP SDU/PDUs attempting to transmit towards the SCG will not be expected to be delivered successfully and it should be re-routed towards the MCG which maintains better radio condition, in order to avoid unnecessary discard of the SDU/PDUs and to deliver absolutely as soon as possible. To do this, the following options can be considered.

1. Introduce a new rule to allow re-routing when the discard timer expires. For example, the UE attempts to retransmit the associated PDCP SDU/PDUs towards the other cell group when the timer expires, and when the timer expires once again the UE discards the PDCP SDU/PDUs.

2. Introduce dual discard timers for each cell groups. With this option the UE can decide whether the PDCP SDU/PDUs should be re-transmitted towards the other cell group (when one timer expires) or discarded (when two timers expire).

3. Introduce dual discard timers for re-routing and discard. With this option the UE try to re-transmits the PDCP SDU/PDUs which have not yet been delivered successfully and starts the second timer when the first timer is expired. Then, the UE discards the PDCP SDU/PDUs when the second timer expires.

Figure 21:
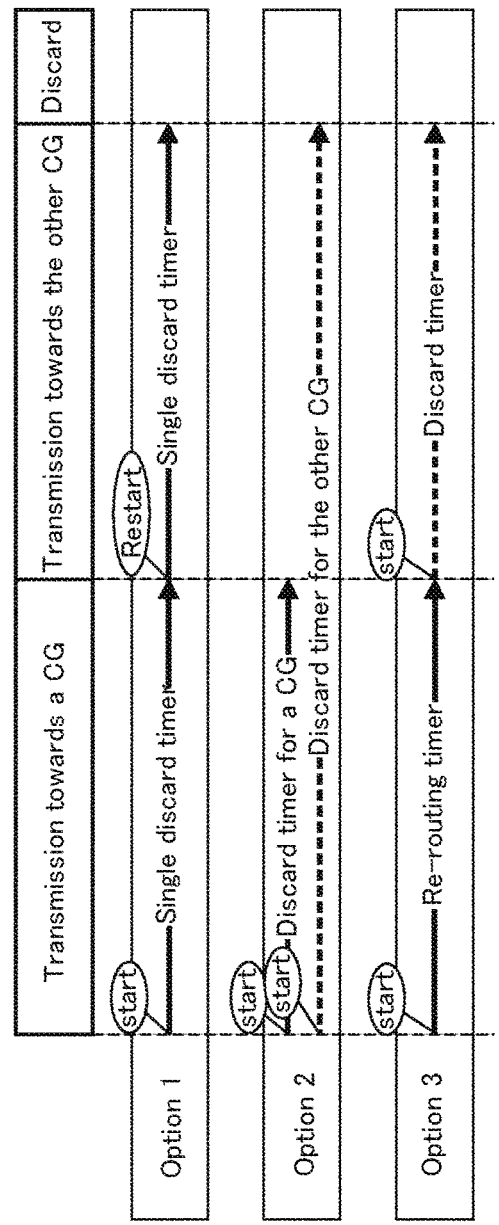
FIG. 21 is an illustration of a re-routing mechanism options.

The three options are depicted in FIG. 21.

Option 2 & 3 potentially have flexibility in the timer configurations, while Option 1 can be configured with only single value for the timer used twice. For example, it can be assumed the radio link towards the SeNB has more capacity, e.g. per-user throughput, than that towards the MeNB, because the SeNB is typically assumed as small cells. In the case, the discard timer for the SeNB should be configured with shorter time than the other timer for the MeNB, in order to avoid unnecessary extension of time to keep the PDCP SDU/PDUs. The same configuration of dual timers can work well in more unstable radio condition of the link to the SeNB than the MeNB, assuming UE movement. Therefore, the option 2 or 3, introducing dual discard timers, is more suitable for appropriate control.

Proposal 5: It should introduce dual discard timer for split bearer.

It is noted that the entire content of U.S. Provisional Application No. 61/968,017 (filed on Mar. 20, 2014) is incorporated in the present specification by reference.

INDUSTRIAL APPLICABILITY

As described above, according to the embodiment-based master base station, mobile station and communication control method, in transmission of uplink data, the dual connectivity scheme can be appropriately performed, and therefore, the present invention is useful in the field of mobile communication.

The invention claimed is:

1. A communication control method, comprising:
transmitting, by a mobile station configured to transmit uplink data of a split bearer by using a first radio base station and a second radio base station, first data belonging to the split bearer to the first radio base station and second data belonging to the split bearer to the second radio base station;
transferring, by the second radio base station, the second data to the first radio base station;
performing, by the first radio base station, order control on the first data and the second data; and
notifying the second radio base station, by the first radio base station, of a permissive processing time of the order control, wherein
the mobile station further establishes a bearer different from the split bearer with at least one of the first radio base station and the second radio base station,
the mobile station has a first PDCP function associated with the split bearer and a second PDCP function of the mobile station associated with the different bearer, and
the communication control method further comprises:
getting, by the first PDCP function, an uplink data amount stored in a transmission buffer region of the second PDCP function from the second PDCP function; and
determining, by the first PDCP function, a transmission ratio on the basis of the uplink data amount got from the second PDCP function.

2. A communication control method, comprising:
transmitting, by a mobile station configured to transmit uplink data of a split bearer by using a first radio base station and a second radio base station, first data belonging to the split bearer to the first radio base station and second data belonging to the split bearer to the second radio base station;
transferring, by the second radio base station, the second data to the first radio base station;
performing, by the first radio base station, order control on the first data and the second data;
deciding, by the mobile station, a transmission ratio of the first data and the second data; and
transmitting, by the mobile station, the first data and the second data, according to the transmission ratio, wherein
the mobile station further establishes a bearer different from the split bearer with at least one of the first radio base station and the second radio base station,
the mobile station has a first PDCP function associated with the split bearer, a first MAC function associated with the first radio base station, and a second MAC function associated with the second radio base station, and
the communication control method further comprises:
getting, by the first PDCP function, an uplink data amount stored in a transmission buffer region toward the first radio base station and an uplink data amount stored in a transmission buffer region toward the second radio base station, from the first MAC function and the second MAC function; and
determining, by the first PDCP function, the transmission ratio on the basis of the uplink data amount got from the first MAC function and the second MAC function.

3. The communication control method according to claim 2, wherein
the mobile station further having an RRC function associated with the split bearer, wherein
the communication control method further comprises:
reporting, by the first MAC function and the second MAC function, the uplink data amount stored in the transmission buffer region toward the first radio base station and the uplink data amount stored in the transmission buffer region toward the second radio base station, to the RRC function; and
getting, by the first PDCP function, the uplink data amount stored in the transmission buffer region toward the first radio base station and the uplink data amount stored in the transmission buffer region toward the second radio base station, from the RRC function.

4. The communication control method according to claim 2, wherein
the mobile station has a transmission buffer region associated with a split bearer, wherein
the communication control method further comprises:
a step of reporting, by the mobile station, amounts of the first data and the second data stored in the transmission buffer region associated with the split bearer, to the first radio base station or the second radio base station; and
a step of designating, by the first radio base station or the second radio base station, a transmission ratio between the first data and the second data, to the mobile station.

5. The communication control method according to claim 2, wherein
the mobile station has a transmission timer for counting a time of the uplink data stored in a transmission buffer region,
the communication control method further comprising:
a step of changing, by the mobile station, a destination of the uplink data remaining in the transmission buffer region from one base station to another base station, when the transmission timer is expired.

6. The communication control method according to claim 5, wherein
the mobile station includes a discard timer for counting a time of store in the transmission buffer region,
the mobile station discards the uplink data remaining in the transmission buffer region, when the discard timer is expired.

7. The communication control method according to claim 2, wherein
the mobile station has a first timer for counting a time of the uplink data stored in the transmission buffer region toward the first base station, and a second timer for counting a time of the uplink data stored in the transmission buffer region toward the second base station, and
when one timer of the first timer and the second timer is expired while the other timer is not expired, the mobile station changes a destination of the uplink data remaining in the transmission buffer region to the other base station corresponding to the other timer.

* * * * *